US011341970B2

(12) United States Patent
Strope et al.

(10) Patent No.: US 11,341,970 B2
(45) Date of Patent: *May 24, 2022

(54) PERSONAL DIRECTORY SERVICE

(71) Applicant: GOOGLE LLC, Mountain View, CA (US)

(72) Inventors: Brian Strope, Palo Alto, CA (US); Francoise Beaufays, Mountain View, CA (US); William J. Byrne, Davis, CA (US)

(73) Assignee: GOOGLE LLC, Mountain View, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 16/896,192

(22) Filed: Jun. 8, 2020

(65) Prior Publication Data

US 2020/0302931 A1 Sep. 24, 2020

Related U.S. Application Data

(60) Continuation of application No. 16/036,662, filed on Jul. 16, 2018, now Pat. No. 10,679,624, which is a
(Continued)

(51) Int. Cl.
*G06F 16/29* (2019.01)
*G10L 15/22* (2006.01)
(Continued)

(52) U.S. Cl.
CPC .............. *G10L 15/22* (2013.01); *G06F 16/29* (2019.01); *G06F 16/951* (2019.01);
(Continued)

(58) Field of Classification Search
CPC ......... G10L 15/18; G10L 15/22; G10L 15/26; G10L 15/30; G10L 15/197; G06F 16/24;
(Continued)

(56) References Cited

U.S. PATENT DOCUMENTS 5,915,001 A 6/1999 Uppaluru
6,173,076 B1 1/2001 Shinoda
(Continued)

FOREIGN PATENT DOCUMENTS

WO WO-02/091360 A1 11/2002

OTHER PUBLICATIONS

Corresponding Australian patent application No. 2007305781 First Examination Report dated Aug. 12, 2011.
(Continued)

*Primary Examiner* — Susan I McFadden
(74) *Attorney, Agent, or Firm* — Marshall, Gerstein & Borun LLP

(57) ABSTRACT

A method of providing navigation directions includes receiving, at a user terminal, a query spoken by a user, wherein the query spoken by the user includes a speech utterance indicating (i) a category of business, (ii) a name of the business, and (iii) a location at which or near which the business is disposed; identifying, by processing hardware, the business based on the speech utterance; and providing navigation directions to the business via the user terminal.

18 Claims, 10 Drawing Sheets

Related U.S. Application Data continuation of application No. 15/284,323, filed on Oct. 3, 2016, now Pat. No. 10,026,402, which is a continuation of application No. 14/454,198, filed on Aug. 7, 2014, now Pat. No. 9,460,712, which is a continuation of application No. 12/913,151, filed on Oct. 27, 2010, now Pat. No. 8,831,930, which is a division of application No. 11/549,484, filed on Oct. 13, 2006, now Pat. No. 7,840,407.

(51) Int. Cl.
| | |
|---|---|
| *G10L 15/26* | (2006.01) |
| *G06Q 30/02* | (2012.01) |
| *G06F 16/951* | (2019.01) |
| *G06F 16/9535* | (2019.01) |
| *G06F 16/9537* | (2019.01) |
| *G10L 15/18* | (2013.01) |
| *G10L 15/197* | (2013.01) |
| *G10L 15/30* | (2013.01) |

(52) U.S. Cl.
CPC ...... *G06F 16/9535* (2019.01); *G06F 16/9537* (2019.01); *G06Q 30/02* (2013.01); *G10L 15/18* (2013.01); *G10L 15/197* (2013.01); *G10L 15/26* (2013.01); *G10L 15/30* (2013.01); *G10L 2015/223* (2013.01); *G10L 2015/228* (2013.01)

(58) Field of Classification Search
CPC ............. G06F 16/9535; G06F 16/9537; G06F 16/951; G06F 16/245; G06F 16/29
USPC ........................................................ 704/257
See application file for complete search history.

(56) References Cited

U.S. PATENT DOCUMENTS

| | | | |
|---|---|---|---|
| 6,173,279 B1 | 1/2001 | Levin et al. | |
| 6,400,806 B1 | 6/2002 | Uppaluru | |
| 6,668,243 B1 | 12/2003 | Odell | |
| 6,684,186 B2 | 1/2004 | Beigi et al. | |
| 6,885,990 B1 | 4/2005 | Ohmori et al. | |
| 7,024,364 B2 | 4/2006 | Guerra et al. | |
| 7,069,238 B2 | 6/2006 | l'Anson et al. | |
| 7,437,295 B2 | 10/2008 | Pitts, III et al. | |
| 7,577,244 B2 | 8/2009 | Taschereau | |
| 7,805,131 B2 | 9/2010 | Cholkar et al. | |
| 7,840,407 B2 | 11/2010 | Strope et al. | |
| 7,890,326 B2 | 2/2011 | Strope et al. | |
| 7,890,957 B2 | 2/2011 | Campbell | |
| 8,041,568 B2 | 10/2011 | Strope et al. | |
| 8,219,406 B2 | 7/2012 | Yu et al. | |
| 8,335,829 B1 | 12/2012 | Jablokov et al. | |
| 8,335,830 B2 | 12/2012 | Jablokov et al. | |
| 8,676,587 B1 * | 3/2014 | Gazdzinski | ............. B66B 3/008 704/270 |
| 8,774,835 B2 | 7/2014 | Cherifi | |
| 8,825,770 B1 | 9/2014 | Jablokov et al. | |
| 8,831,930 B2 | 9/2014 | Strope et al. | |
| 9,053,489 B2 | 6/2015 | Jablokov et al. | |
| 9,189,742 B2 | 11/2015 | London | |
| 9,300,784 B2 * | 3/2016 | Roberts | ............. H04M 1/72457 |
| 9,460,712 B1 | 10/2016 | Strope et al. | |
| 10,026,402 B2 | 7/2018 | Strope et al. | |
| 10,170,114 B2 * | 1/2019 | Printz | ..................... G10L 15/19 |
| 2002/0087315 A1 | 7/2002 | Lee et al. | |
| 2006/0010138 A1 | 1/2006 | Huerta et al. | |
| 2008/0091412 A1 | 4/2008 | Strope et al. | |
| 2008/0091435 A1 | 4/2008 | Strope et al. | |
| 2008/0091443 A1 | 4/2008 | Strope et al. | |

OTHER PUBLICATIONS

Corresponding Australian patent application No. 2007305781 Second Examination Report dated Aug. 31, 2012.
European Office Action for App. No. EP07854057, dated Apr. 19, 2011, 6 pages.
International Preliminary Report on Patentability dated Apr. 23, 2009 for corresponding PCT application No. PCT/US2007/081409.
International Preliminary Report on Patentability dated Apr. 23, 2009 for corresponding PCT Application No. PCTUS2007081409, 9 pages.
International Search Report and Written Opinion dated Apr. 10, 2008 for corresponding PCT Application No. PCTUS2007081409, 13 pages.
Supplementary European Search Report for App. No. EP07854057, dated Apr. 11, 2011, 3 pages.

* cited by examiner

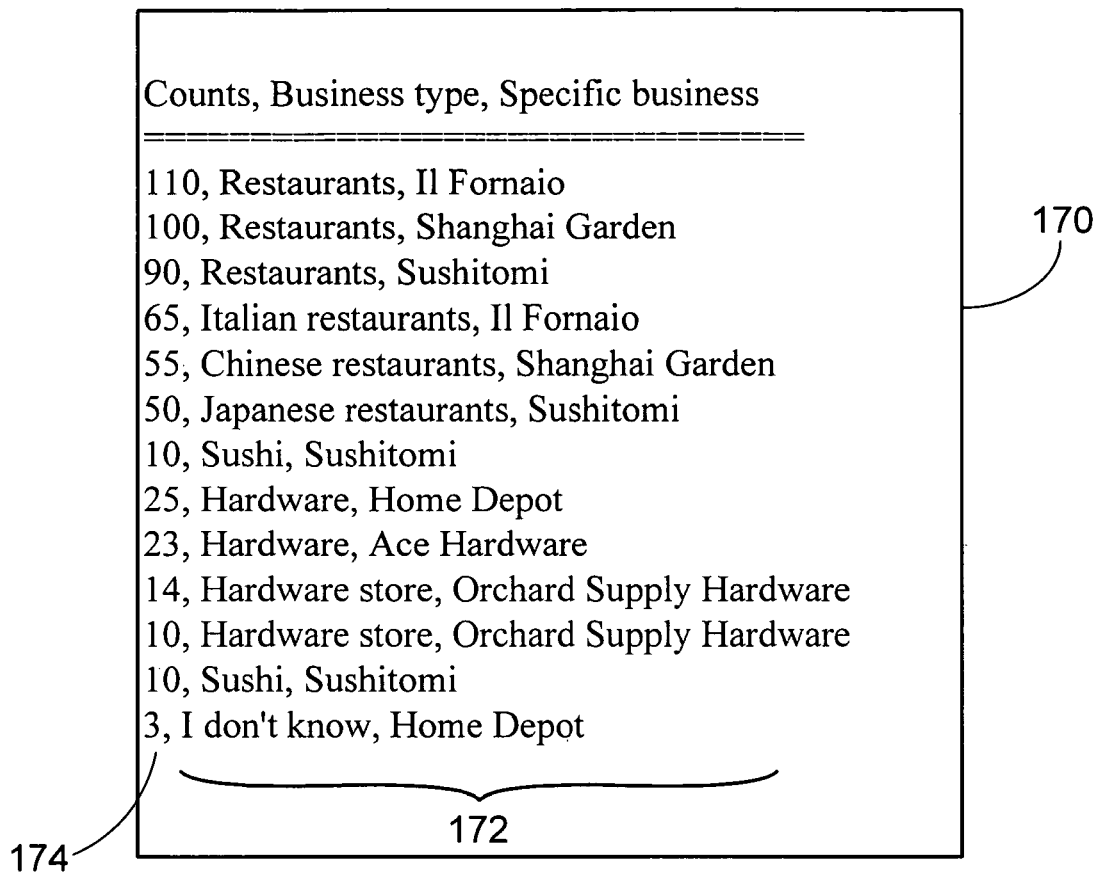
FIG. 4A
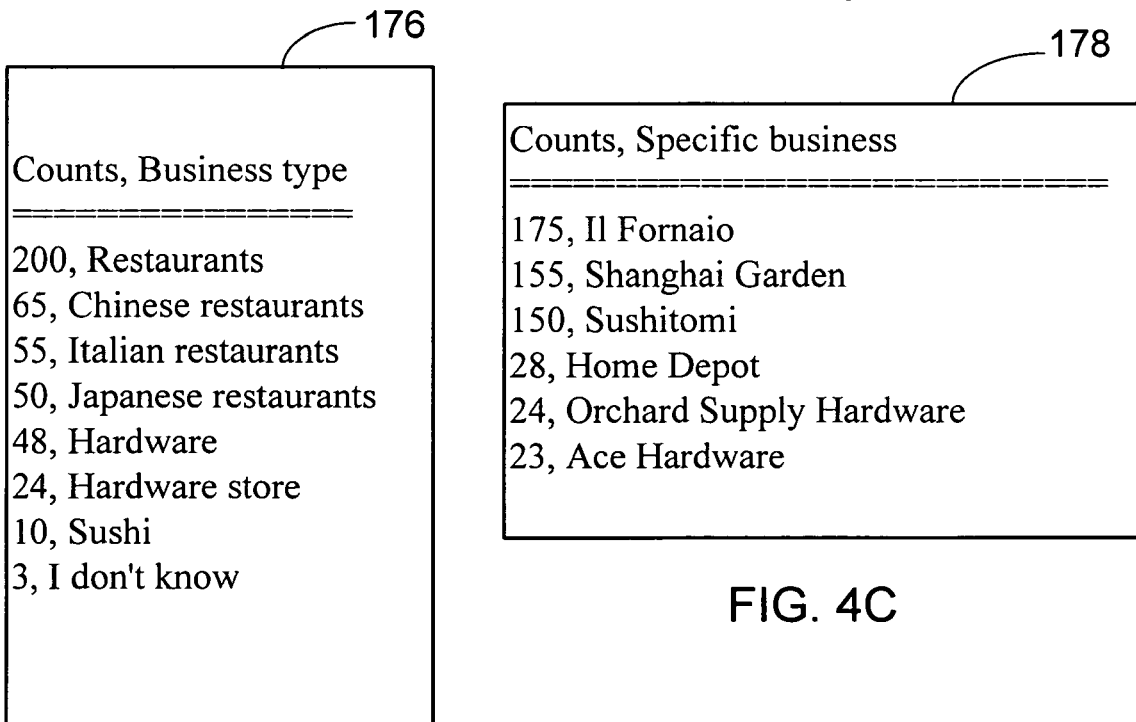
FIG. 4B
FIG. 4C

PERSONAL DIRECTORY SERVICE

CROSS-REFERENCE TO RELATED APPLICATIONS

This application is a continuation of U.S patent application Ser. No. 16/036,662, filed Jul. 16, 2018; which is a continuation of U.S patent application Ser. No. 15/284,323, filed 3 Oct. 2016; which is a continuation of U.S patent application Ser. No. 14/454,198, filed 7 Aug. 2014, which is a continuation of U.S. patent application Ser. No. 12/913,151, filed 27 Oct. 2010, titled "Business Listing Search," which is a divisional of U.S. Pat. No. 7,840,407, filed 13 Oct. 2006, titled "Business Listing Search," the entire contents which are hereby incorporated by reference for all purposes. This application is related to U.S. Pat. No. 8,041,568, filed 13 Oct. 2006, titled "Business Listing Search" and U.S. Pat. No. 7,890,326, filed 13 Oct. 2006, titled "Business Listing Search," the entire contents of which are incorporated by reference for all purposes.

BACKGROUND

The description relates to information management.

When a user wishes to find the phone number of a specific business, the user can employ an information retrieval system (e.g., the user can dial 411 to speak with an operator). The information retrieval system (e.g., the operator) may ask the caller the name of the business and the city and state where the business is located. A search is then performed based on the user input and a reply is forwarded to the user with the requested phone number. An automated 411 directory assistance system can have an automated voice response system that interacts with the caller in a way that mimics the manner in which a human operator would interact with a caller. A conventional automated system includes a speech recognition engine that recognizes the caller's speech input. The automated system includes a search engine that searches a database for the phone number of the specific business requested by the caller. If the speech recognition engine cannot recognize the caller's speech input, the recognition engine may ask the caller to repeat the input, ask the caller disambiguating questions, or transfer the call to a human operator.

SUMMARY

In one aspect, in general, a method of operating a voice-enabled business directory search system is provided that includes a voice-enabled user interface that queries the caller for type of business or category information in addition to geographical information and an identifier of the specific business. A voice recognition engine recognizes the identifier of the specific business based on the business type and the geographical information. A search engine searches a database to find information (e.g., phone number) about the specific business.

The system may establish business types based on user input. The user input can be information provided by users in past calls or on-line search activities of users, such as keyword searches and click-through. For example, the system may establish a new business type if a number of users typed in a certain keyword or phrase, and later clicked on specific businesses, indicating that the users associated the specific businesses with the keyword or phrase.

In another aspect, in general, a method is provided that includes receiving category-business pairs, each category-business pair including a business category and a specific business, and establishing a data structure having nodes based on the category-business pairs. Each node of the data structure is associated with one or more business categories and a speech recognition language model for recognizing specific businesses associated with the one or more businesses categories.

Implementations of the method may include one or more of the following features. Establishing the data structure includes establishing a hierarchical tree of nodes. Establishing the hierarchical tree includes establishing a child node of a parent node, and associating with the child node a subset of business categories that are associated with the parent node. The method includes associating a first speech recognition language model with the parent node and a second speech recognition language model with the child node, the second language model being more accurate in recognizing the specific businesses associated with the subset of business categories than the first language model. A language model may be constructed from a combination of other language models. Recognizing specific businesses includes recognizing the names of the specific businesses. Establishing the data structure includes assigning business categories to particular nodes based on similarities between the business categories being assigned and the business categories already assigned to the nodes. Establishing the data structure includes establishing new nodes based on entropy values of existing nodes, the entropy of a node indicating a degree of variation of at least one of (a) the one or more business categories associated with the node and (b) the one or more specific businesses associated with the node. Establishing the data structure includes adding new nodes until all the nodes have entropy values below a predetermined threshold. Receiving information includes receiving information from a call log. The method includes logging call data about usage of a business listing service in which one or more users asked for information about specific businesses. Receiving information includes receiving information from a search log. The method includes logging information about keyword searches performed by one or more users and subsequent selection of search results by the one or more users. The method includes using a speech recognition module to recognize additional category-business pairs using the data structure. The method includes updating the data structure using the additional category-business pairs.

In another aspect, in general, a method is provided that includes collecting information about associations of specific businesses with categories from keyword searches, establishing speech recognition language models based on the information, and recognizing specific businesses in a speech utterances using the language models. Each language model is associated with one or more categories, and each language model is used for recognizing specific businesses associated with the one or more categories.

Implementations of the method may include one or more of the following features. The method includes establishing a hierarchical tree having nodes, each node being associated with one or more of the categories and one of the speech recognition language models. The keyword searches include at least one of web searches, intranet searches, and desktop searches.

In another aspect, in general, a method is provided that includes receiving a speech input having information about a business category and an identifier of a specific business, mapping the type of business in the speech input to nodes in a data structure, and recognizing the identifier of the specific business using one or more language models determined based on the mapping. Each node of the data structure is associated with one or more business categories and a speech recognition language model.

Implementations of the method may include one or more of the following features. The mapping includes, for each of some of the nodes, determining a similarity score representing a similarity between the business category in the speech input and the one or more business categories associated with the node. The method includes generating weights for the language models based on the similarity scores. The method includes finding a particular node having a highest similarity to the business category in the speech input, and using a first language model associated with the particular node and a second language model associated with a parent node of the particular node to recognize the identifier.

In another aspect, in general, an apparatus is provided that includes a category clustering module to receive category-business pairs and update a data structure having nodes using the received category-business pairs. Each category-business pair includes a business category and a specific business. Each node in the data structure is associated with one or more business categories and a speech recognition language model for use in recognizing identifiers of specific businesses associated with the one or more types of businesses.

Implementations of the apparatus may include one or more of the following features. The apparatus includes at least one of a call log and a search log for providing information about the category-business pairs. The data structure includes a hierarchical tree of nodes. A language model may be constructed from a combination of other language models. The category clustering module establishes a child node branching off from a parent node and associates with the child node a subset of business categories that are associated with the parent node. The apparatus includes a language model updating module to associate a first speech recognition language model with the child node, the first language model being more accurate in recognizing the identifiers of specific businesses associated with the child node than a second language model associated with the parent node. The category clustering module assigns business categories to particular nodes based on similarities between the business categories being assigned and the business categories already assigned to the nodes. The category clustering module establishes new nodes based on entropy values of existing nodes, the entropy of a node indicating a degree of variation of at least one of (a) the one or more business categories associated with the node and (b) the one or more specific businesses associated with the node.

In another aspect, in general, an apparatus is provided that includes a voice-enabled user interface to receive a speech input having information about a business category and an identifier of a specific business, a mapping module to compare the business category to a plurality of nodes of a data structure, and a speech recognition module to recognize the identifier of the specific business using one or more language models determined based on the mapping. Each node of the data structure is associated with one or more business categories and a speech recognition language model.

Implementations of the apparatus may include one or more of the following features. The mapping module determines, for each of some of the nodes, a similarity score between the business category in the speech input and the one or more business categories associated with the node. The mapping module generates weights for the one or more language models based on the similarity scores. The mapping module finds a particular node having a highest similarity to the business category in the speech input, and uses a first language model associated with the particular node and a second language model associated with a parent node of the particular node to recognize the identifier.

In another aspect, in general, an apparatus is provided that includes means for receiving category-business pairs, each category-business pair including a business category and a specific business. The apparatus includes means for establishing a data structure having nodes based on the category-business pairs, each node being associated with one or more particular business categories and a speech recognition language model for recognizing specific businesses associated with the one or more particular businesses categories.

Implementations of the apparatus may include one or more of the following features. The apparatus includes means for updating the data structure based on new category-business pairs.

In another aspect, in general, an apparatus is provided that includes means for mapping information about a business category to a plurality of nodes of a hierarchical tree and generating weight values for the nodes, each node being associated with one or more business categories and a language model for recognizing specific businesses associated with the one or more business categories. The apparatus includes a speech recognition engine to recognize a specific business in a speech input using one or more language models determined based on the mapping.

Implementations of the apparatus may include one or more of the following features. The mapping means determines weight values for the nodes based on the mapping, and the one or more language models are weighted by the weight values.

Advantages of the apparatus and methods can include one or more of the following. The system can recognize business types that are more intuitive for users because the business types include those that are established based on user input. The speech recognition engine can recognize the caller's speech input more accurately by reducing the number of recognition model candidates based on the business type. Speech recognition language models, each for recognizing a narrower range of specific businesses, can be combined to recognize a wider range of specific businesses. When a hierarchy of business categories are established, speech recognition language models for higher-level categories can be constructed from a combination of lower-level language models. This allows the system to store a smaller number of speech recognition language models, as compared to a system that stores a separate language model for every category.

DESCRIPTION OF DRAWINGS

FIGS. 4A to 4C are diagrams of information associated with a node of the hierarchical tree.

DESCRIPTION

1. System Overview

Figure 1:
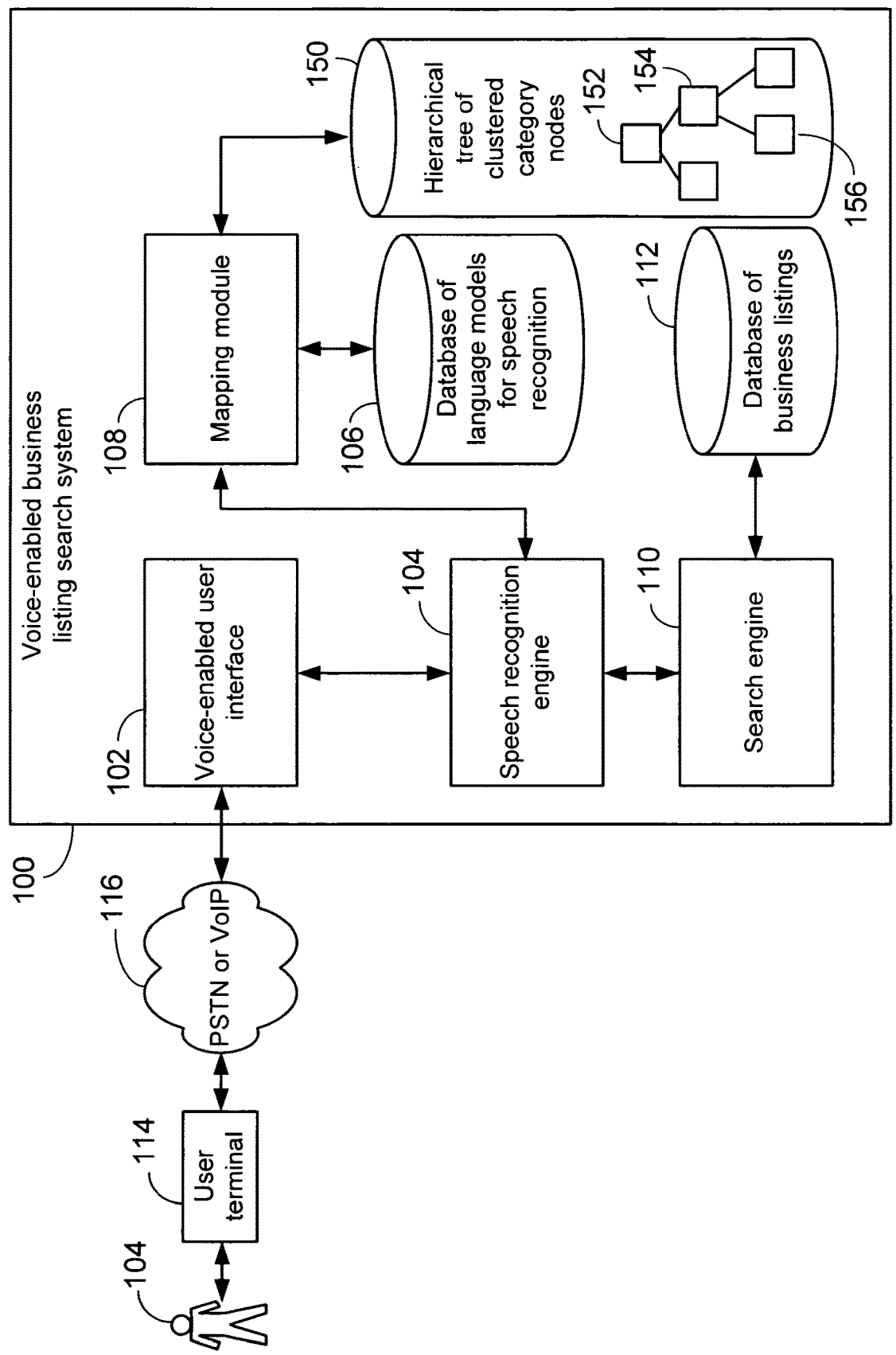
FIG. 1 is a block diagram of an exemplary voice-enabled business listing search system.

Referring to FIG. 1, an example of a voice-enabled business listing search system 100 includes a voice-enabled user interface 102 that interacts with a caller 104. The caller 104 may use a terminal 114 (e.g., a telephone or a computer) to connect to the system 100 through a network 116 (e.g., a public switched telephone network (PSTN) or a voice over Internet Protocol (VoIP) network). The user interface 102 receives queries from the caller 104 about a specific business and responds with information related to the specific business.

The voice-enabled user interface 102 may use scripts that specify the interactions between the system 100 and the caller 104. The user interface 102 may include a text-to-speech module (not shown) that converts text sentences into speech outputs. For example, the scripts may include instructions that instruct the user interface 102 to announce a greeting message to the caller 104 (e.g., "nation wide business directory"), prompt the caller 104 for a geographical location of a specific business (e.g., "city and state, please"), prompt the caller 104 for a type of business or category of the specific business (e.g., "type of business or category, please"), and prompt the caller 104 for an identifier or name of the specific business (e.g., "name of the business, please"). By asking the caller 104 for the type of business in addition to the geographical location of the specific business, the system 100 can more accurately deliver relevant information to the user.

For example, a large city such as New York city may have thousands of businesses. It may be difficult to recognize a specific business based on a speech utterance from an arbitrary caller 104, in which the speech utterance may represent any one of the thousands of businesses, some having the same name. By asking the caller 104 for the type of business, the system 100 can bias the speech recognition towards language model(s) or grammar units related to the type of business so the number of candidates of business names that may match the caller's speech utterance can be reduced. This allows the system 100 to recognize the speech utterance for the business name more accurately in a given amount of time using a given amount of computing resource.

In this description, the terms "type of business," "business type," and "business category" have similar meanings and are used interchangeably.

The system 100 includes a speech recognition engine 104 for recognizing the speech utterances of the caller 104 using language models in a database 106. The speech recognition engine 104 may use a pre-processor (not shown) to filter noise and detect the start and end of words or phonemes in the speech utterance. The speech recognition engine 104 and the language models can be based on various types of speech recognition techniques, such as Hidden Markov Models or neural networks.

The form of the language models can include, e.g., N-grams, phrase-list grammars, and hybrid grammars. In N-grams, the probability of any word in the vocabulary is estimated by counting the occurrences of that word in the context of the last N words. In phrase-list grammars, the probability of a complete phrase (e.g., each full business name) is estimated independently by counting the occurrences of that full phrase. In hybrid grammars, both n-grams and phrase-list grammars are used.

The language models in the database 106 can be organized in different groups. For example, a first, a second, a third, and a fourth group of language models can be used to recognize the name of a city, the name of a state, the name of a business type, and the name of a specific business, respectively.

There can be many variations in the names of specific businesses, so the number of language models used for recognizing the names of specific businesses can be large. To help find the appropriate language model or models to use during speech recognition, the system 100 builds hierarchical trees 150 of clustered category nodes in which each node is associated with a language model. Each node includes information about one or more names of specific businesses and their corresponding types of businesses. In one implementation, the language model for a particular node includes information useful in recognizing the business names associated with the particular node.

In one implementation, the hierarchical tree 150 includes a root node 152 that is associated with a language model used to recognize names of specific businesses without bias towards any particular type of business or category. Each node below the root node is associated with a subset of all the types of businesses and specific businesses. Each language model associated with a node below the root node can be biased toward recognizing a subset of types of businesses.

Within the hierarchical tree 150, each child node (e.g., 156) includes a subset of the specific businesses and the types of businesses in a parent node (e.g., 154) of the child node. Each language model associated with the child node can be biased towards a narrower range of types of businesses than a language model associated with a parent node. Thus, for example, a parent node may be associated with all restaurants, include Italian and Japanese restaurants. A first child node may be associated with Italian restaurants, and a second child node may be associated with Japanese restaurants. A first language model associated with the parent node can be used to recognize all the restaurants, a second language model associated with the first child node can be used to recognize all Italian restaurants, and a third language model associated with the second child node can be used to recognize all Japanese restaurants.

A language model associated with a child node is generally more accurate in recognizing names of specific businesses associated with particular types of businesses than language models associated with a parent node. In the example above, the second and third language models are generally more accurate in recognizing names of Italian and Japanese restaurants, respectively, than the first language model.

The system 100 builds two types of hierarchical trees 150. A first type of tree 150 is built based on information about all specific businesses across all the geographical locations, e.g., the entire United States, that can be recognized by the system 100. The first type of tree 150 will be referred to as a generic hierarchical tree. The language models associated with the nodes of the generic tree are referred to as generic language models, i.e., language models that can be used to recognize specific businesses located in any geographical location.

A second type of tree 150 is built based on information about all specific businesses within a geographical region, e.g., New York city. The second type of tree 150 will be referred to as location-specific hierarchical trees. The language models associated with the nodes of a location specific tree will be referred to as location-specific language models, i.e., language models that can be used to recognize specific businesses located within a specific geographical location.

When the caller 104 interacts with the user interface 102, the caller 104 may not be entirely accurate and may, e.g., provide a geographical location of a specific business that is imprecise (e.g., in fact the specific business is situated at another nearby geographical location). Therefore, it is useful to use both generic and location-specific language models in recognizing the name of a specific business. The speech recognition engine 104 may assign different weights to the generic and location specific language models, e.g., giving more weight to the location specific language models than the generic language models. For example, when the caller 104 asks for information about an Italian restaurant in San Jose, the final language model used for the speech recognition may be a combination of a generic language model for recognizing Italian restaurants, and (e.g., four) location-specific language models for recognizing Italian restaurants in the identified city (e.g., San Jose) and other nearby (e.g., adjacent) locations (e.g., Palo Alto, Sunnyvale, and Mountain View, respectively).

The weights assigned to the different location-specific language models can be determined using a number of ways. For example, language models for recognizing businesses in a geographical location closer to the particular geographical location provided by the caller 104 may be given higher weights than language models associated with geographical locations that are farther away.

The system 100 includes a mapping module 108 for evaluating the hierarchical tree 150 to determine which node is more relevant or closer to the type of business provided by the caller 104. The mapping module 108 may use a similarity measure, described in more detail below, in evaluating the tree 150. For example, if the caller 104 provides "Italian restaurant" as the type of business, the mapping module 108 may determine that the node associated with the more specific "Italian restaurants" type of business may be more relevant than the node associated with the more generic "restaurants" type of business.

After the mapping module 108 determines that a particular node is more relevant, the speech recognition engine 104 uses the language model associated with the particular node to recognize the name of the specific business in the speech input from the caller 104. The caller 104 may not be precise or accurate is describing the type of business when interacting with the user interface 102. For example, the caller 104 may say "hardware store" as the type of business when in fact he/she is looking for a locksmith. Therefore, it is useful to use a combination of the language model associated with the particular node (which is associated with a narrower range of types of businesses) and language model(s) associated with the ancestor node(s) (which are associated with a wider range of types of businesses) in recognizing the name of the specific business. The language model associated with the particular node is more accurate in recognizing names of specific businesses associated with the type of business provided by the caller 104, while the language model(s) associated with ancestor node(s) provide fall back positions in case the specific business requested by the caller 104 does not fall under the type of business provided by the caller 104.

In some examples, the number of language models associated with ancestor nodes that are used in the combination may be set to a predefined number. In some examples, language models associated with all the ancestor nodes up to the root node may be used. In the example above, the nodes associated with "hardware store" and "locksmith" types of businesses will have at least one common ancestor node— the root node 152, so using ancestor nodes all the way up to the root node 152 can provide a fall back position to all other types of businesses.

The different language models used in the combination can be given different weights. The weight values can be determined using a number of ways. For example, the language model associated with the particular node may be given the highest weight, and language models associated with ancestor nodes (e.g., grandparent) that are farther away may be given smaller weights than language models associated with ancestor nodes (e.g., parent) that are closer to the particular node. The weight values can be determined based on the similarity measure used by the mapping module 108 in determining which node is more relevant or closer to the type of business provided by the caller 104.

After the speech recognition engine 104 recognizes the speech utterance of the caller 104 to determine the specific business name, a search engine 110 searches a database 112 of business listings to find information about the specific business. The information can be, e.g., the telephone number of the specific business.

When searching the database 112, the search engine 110 may use information about the geographical location, the type of business, and the specific business name recognized by the speech recognition engine 104 to find one or more matches in the database 112. In some cases, the caller's speech utterance may be imprecise, or the recognition of the specific business in the speech utterance may be imprecise. For example, the speech recognition engine 104 may identify one specific business name that matches the caller's speech utterance, but there may be multiple business listings in the database 112 that are equally similar to the recognized business name. In some cases, the speech recognition engine 104 may return multiple candidates representing potential matches for the specific business in the speech utterance. Each candidate from the speech recognition engine 104 may potentially match multiple business listings in the database 112. By using information about the type of business in addition to the geographical location and the recognized specific business, the search engine 110 can more accurately identify the specific business listing in the database 112, or narrow down the number of candidates of business listings from the database 112 to be presented to the caller 104.

The following describes an exemplar method for searching the database 112 using recognition results from the speech recognition engine 104. The search engine 110 may perform two searches. The first search is based on information about the geographical location and the type of business or category. The second search is based on the geographical location and the specific business. The first search returns all business listings in the type of business within the geographical location. The second search returns all business listings that match the recognized specific businesses within the geographical location. Both searches may each return a list of possible business names with associated likelihood weights or search scores (based on features such as the exactness of the word match, the estimated importance of each word, and the expected relevance of the business, etc.). The two lists are merged so that any businesses that show up in both lists are reduced to one result with a new score that is the sum of the scores from each list. Information (e.g., phone number) about the top, e.g., three, candidates from the combined list are returned to the caller 104.

The search engine 110 sends the information to the user interface 102, which announces the information to the caller 104. The user interface 102 may announce options for the caller 104 to choose from, such as announcing the telephone number of the specific business and asking the caller 104 whether he/she wishes to be connected directly to the specific business or have more details (e.g., address) about the specific business. The user interface 102 may also provide an option to send a short text message including information about the specific business to the caller 104.

In some cases, the speech recognition engine 104 may determine that more than one specific business matches the caller's speech utterance with probabilities above a predetermined threshold. The speech recognition engine 104 may provide a list of specific business names to the search engine 110, which searches information about the specific businesses. The search engine 110 sends the information to the user interface 102, which announces a list of business names and prompts the user to select from one of them. In one implementation, upon receiving a speech utterance (or, e.g., a dual-tone multi-frequency (DTMF) signal) indicating the caller's selection, the user interface 102 announces the phone number of the selected specific business and asks the caller 104 whether he/she wishes to be connected directly to the business, hear more details about the specific business, or receive a short text message including information about the specific business.

Figure 2:
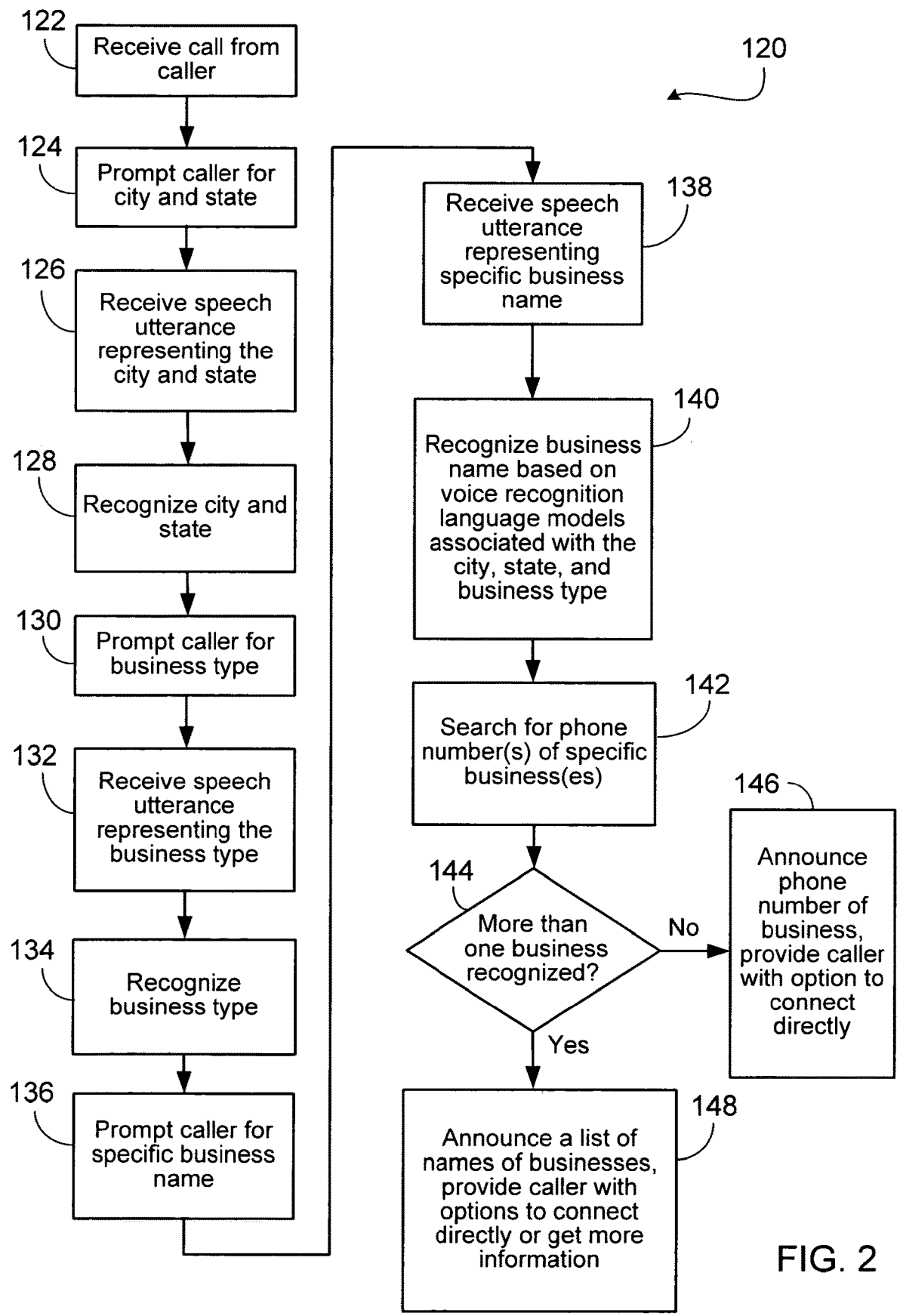
FIG. 2 is a flow diagram of an exemplary process for providing voice-enabled business listing search service.

FIG. 2 is a flow diagram of an exemplary process 120 for receiving a query about a specific business from a caller 104 and providing information about the specific business to the caller 104. A call is received 122 from the caller 104. The caller 104 is prompted 124 for the geographical location, such as the city and state, of the specific business. A speech utterance representing the city and state is received 126 from the caller 104. The city and state are recognized 128. The user is prompted 130 for the business type (or category) of the specific business. A speech utterance representing the business type is received 132 from the caller 104. The business type is recognized 134. The user is prompted 136 for the name of the specific business. A speech utterance representing the name of the specific business is received 138 from the caller 104.

The specific business name is recognized 140 based on speech recognition language models biased, for example, toward the city, state, and type of business. Other bias examples are possible including other combinations of factors (e.g., bias based on state and type of business only). A search is conducted 142 to find data (e.g., the phone number(s)) corresponding to the recognized name(s) of specific business(es). If only one business name is recognized 144, the data (e.g., phone number) of the specific business is announced 146, and the caller 104 is provided with the option to connect directly to the specific business. If more than one business name are recognized, a list of names of businesses is announced 148, and the caller 104 is provided with the option to connect directly with a particular business or to get more information, such as the phone number of a particular business.

In process 120, the prompting of the caller 104 and receiving of speech utterances from the caller 104 can be performed by, e.g., the voice-enabled user interface 102. The recognition of the speech utterances from the caller 104 can be performed by using, e.g., the speech recognition engine 104, the mapping module 108, the hierarchical tree 150, and the database 106 of language models. The search for phone number(s) of the specific business(es) can be performed by using, e.g., the search engine 110 and the database 112 of business listings.

The following is an example of an interaction between the system 100 and the caller 104 according to the process 120:

System 100: Nation wide business listing search. City and state, please.
    Caller 104: Palo Alto, Calif.
    System 100: What type of business or category?
    Caller 104: Italian restaurants.
    System 100: What specific business?
    Caller 104: Il Fornaio
    System 100: Search result, Il Fornaio on Cowper Street, Palo Alto. (650) 853-3888. Do you wish to connect directly?
    Caller 104: Connect me.

The following is another example of an interaction between the system 100 and the caller 104 according to the process 120:

System 100: Nation wide business listing search. What is the specific business you are looking for?
    Caller 104: Il Fornaio
    System 100: What type of business is that?
    Caller 104: Italian restaurants.
    System 100: Where is it located?
    Caller 104: Palo Alto, Calif.
    System 100: Search result, Il Fornaio on Cowper Street, Palo Alto. (650) 853-3888. Do you wish to connect directly?
    Caller 104: Connect me.

The system 100 may fall back to using category-only search when the recognition of the specific business is not successful. By asking the caller for the type of business or category, it is possible that the system 100 may find the specific business that the caller 104 is looking for (or business listings that are close enough to be useful) using only the type of business or category information, in the event that the speech recognition engine 104 is unable to recognize the specific business.

The following is an example of an interaction between the system 100 and the caller 104 with fall back to category-only search:

System 100: Nation wide business listing search. What city and state, please.
    Caller 104: Palo Alto, Calif.
    System 100: What type of business?
    Caller 104: Japanese restaurant.
    System 100: What's the business name?
    Caller 104: fuki sushi
    System 100: We didn't recognize that, but here are the results for Japanese restaurants in Palo Alto, please select one:
    Number 1: Sushitomi
    Number 2: Fuki Sushi
    Number 3: . . .

The system 100 may ask the caller 104 questions in sequences and combinations different from the above. For example, the system 100 may ask for the geographical location first, then ask for the specific business, then ask for the type of business. The system 100 may ask for the specific business first, then ask for the geographical location, then ask for the type of business. The system 100 may ask for the type of business first, then ask for the geographical location, then ask for the specific business. The system 100 may ask for the type of business first, then ask for the specific business, then ask for the geographical location.

For example, the system 100 may ask for the geographical location and specific business in the same voice prompt, then ask for the type of business. The system may ask for the geographical location and type of business in the same voice prompt, then ask for the specific business. The system may ask for the specific business and the type of business in the same voice prompt, then ask for the geographical location. The system 100 may ask for the type of business, then ask for the geographical location and specific business in the same voice prompt. The system may ask for the specific business, then ask for the geographical location and type of business in the same voice prompt. The system may ask for the geographical location, then ask for the specific business and the type of business in the same voice prompt. The system may ask for the geographical location, the type of business, and the specific business all in the same voice prompt.

In implementations where the user interface 102 asks the caller 104 about the specific business before asking for the geographical information or the type of business, the system 100 may store a recording of the caller's utterances about the specific business, and then re-recognize the recorded utterance using a grammar biased by the recognized type of business or category.

2. Construction and Use of Hierarchical Trees

The following describes classification of businesses and the construction of hierarchical trees.

The system 100 asks the caller 104 for the type of business or category of a specific business to improve the accuracy in recognizing the name of the specific business. Because different callers 104 may classify businesses differently, it is useful for the system 100 to be flexible in treating the information about the type of business or category. For example, when looking for information about Walmart, in response to a question about type of business or category, some people may say "Supercenter," while others may say "Chain store," "Retailer," "Grocery store," or "I don't know." It is possible that the caller 104 may not have thought about the type of business or category before being asked the question, and responds with the first notion that comes to mind. For example, a person who plans to go to Walmart to purchase a DVD may say "Video store," while another person who plans to go to Walmart to purchase a bottle of vitamin may answer "Pharmacy."

They system 100 can use a number of ways to classify businesses. One way of classifying businesses is to build a hierarchical tree of nodes, in which each node corresponds to a type of business. The hierarchical tree can be constructed based on the data collected from users so that the tree structure reflects a classification of businesses by the users. The system 100 may update the hierarchical tree over time as the system 100 collects more data about user's intuitive classification of businesses.

By comparison, the classification of businesses used by a conventional directory service (e.g., Yellow Pages) is substantially fixed. If a user wishes to find a particular business without knowing the business name, the user would have to know what category the particular business falls under within the categories provided by the conventional directory service. For example, if a user wishes to find a particular business near a specified location that sells garden tools, but does not know the business name, the user might query the convention directory service and ask for businesses listed under the "Hardware stores" category near the specified location. The conventional directory service may respond with a list of all the businesses falling under the "Hardware stores" category near the specified location. If the particular business that the user is looking for is not classified as a hardware store by the conventional directory service, but is classified under the "Garden center" category, then the response from the conventional directory service would not include the particular business that the user is looking for. The user may think that the particular business is not listed in the conventional directory, when in fact the particular business is listed in the conventional directory under a different category.

Figure 3:
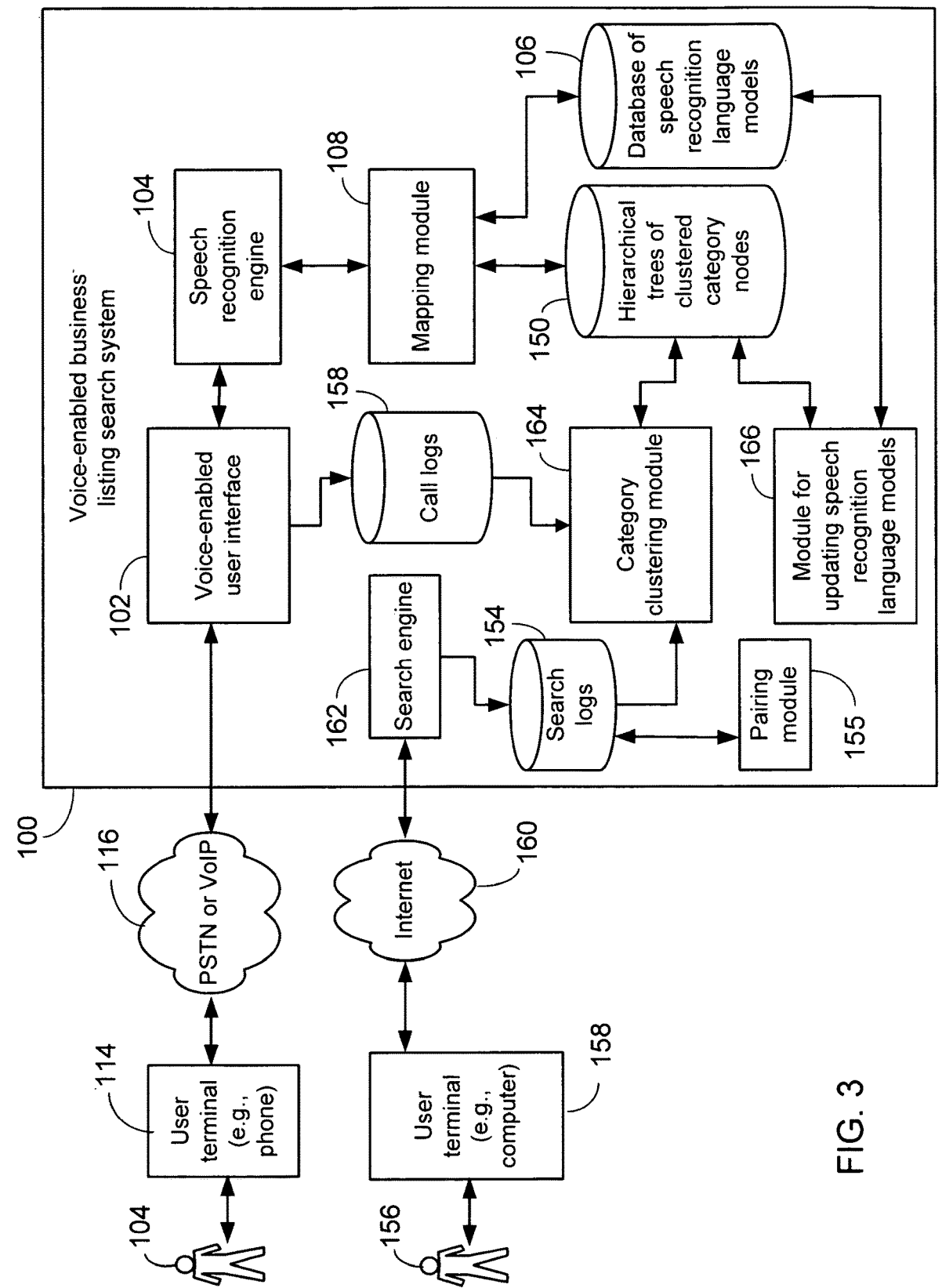
FIG. 3 is a block diagram of an exemplary voice-enabled business listing search system that can establish a hierarchical tree of clustered category nodes based on user input.

FIG. 3 is a block diagram of an example of modules of the system 100 that can be used for building and updating a hierarchical tree 150 of clustered category nodes and a database 106 of language models for speech recognition. The user interface 102, speech recognition engine 104, and mapping module 108 are the same as those in FIG. 1, and are used to recognize user speech input. The system 100 includes a search engine 162 (which is different from the search engine 110 of FIG. 1) that is used to perform keyword searches and return a list of links pointing to web pages or documents that contain specific keywords. The system 100 includes an automated category clustering module 164 that builds and updates the hierarchical tree 150 using data collected from, for example, call logs 152 and search logs 154.

Call logs 152 include data that are logged from past calls, including data on how past callers 104 associate specific businesses with particular types of businesses or categories. For example, each time the process 120 of FIG. 2 is performed, the user interface 102 keeps track of dialog states, allowing the recognized geographical location, type of business, and name of a specific business to be logged in the call log 152. The recognized pairs of types of businesses and names of specific businesses are used by the category clustering module 164 in updating the hierarchical tree 150.

The term "category-business pair" will be used to refer to a pair of a type of business and a specific business (or a business category and a specific business).

Search logs 154 include data that are logged from past searches. For example, a user 156 may use a terminal 158 (e.g., a computer) to send a query with keyword(s) over the Internet 160 to the search engine 162. The search engine 162 searches an information database (not shown) and returns a list of links to documents or web pages containing the keyword(s). When the user 156 subsequently selects one of the links, there is an indication that the user 156 associates the keyword(s) with the document or web page pointed to by the selected link. If the document or web page is associated with a specific business, then the keyword(s) used in this search can potentially be used to define a type of business or category for the specific business.

A pairing module 155 can run in the background and analyze the query strings and the users' selections of search results (e.g., links or documents) that are logged in the search logs 154. The pairing module 155 determines whether a search result selected by a user is related to a specific business, and what keywords were used in the query. The pairing of the specific business and the keywords are also logged in the search logs 154.

In one example, the user 156 sends a query with keywords "Italian restaurants" to the search engine 162, and the search engine 162 returns a list of links pointing to web pages of Italian restaurants. The user 156 selects a link pointing to a web page of a specific restaurant, e.g., Il Fornaio, and is directed to Il Fornaio restaurant's web page. By selecting a link pointing to Il Fornaio after submitting the keywords "Italian restaurants," the user indicates that he/she associates Il Fornaio with the type of business "Italian restaurants." Thus, the specific business Il Fornaio can be placed in a node of the hierarchical tree 150 associated with the type of business "Italian restaurants."

The search engine 162 receives queries from many users. If the hierarchical tree 150 does not have a node associated with "Italian restaurants," and many users submit queries using keywords "Italian restaurants" and subsequently select links pointing to Il Fornaio, then the keywords "Italian restaurants" can be used to establish a new node in the hierarchical tree 150, with the specific business "Il Fornaio" being a member of the new node.

Similarly, if the user 156 submits a query with the keyword "restaurants" and subsequently selects a link pointing to Il Fornaio, the business Il Fornaio can be placed in a node of the hierarchical tree 150 associated with the type of business "restaurants." Because different people may classify the same business according to different types of businesses, a specific business can be a member of several different nodes in the hierarchical tree 150.

As another example, the user 156 sends a query with a keyword "sushi" to the search engine 162, and the search engine 162 returns a list of links pointing to web pages teaching how to make sushi, web pages of vendors of sushi supplies, and web pages of restaurants serving sushi. The user 156 selects a link pointing to a web page of a specific restaurant, e.g., Sushitomi, and is directed to Sushitomi restaurant's web page. By selecting a link pointing to Sushitomi after submitting the keyword "sushi," the user indicates that he/she associates Sushitomi with the type of business or category "sushi." Thus, the specific business Sushitomi can be placed in a node of the hierarchical tree 150 associated with the type of business or category "sushi."

If the hierarchical tree 150 does not have a node associated with "sushi," and many users submit queries using keyword "sushi" and subsequently select links pointing to Sushitomi, then the keyword "sushi" can be used as a type of business or category to establish a new node in the hierarchical tree 150, with the specific business Sushitomi being a member of the new node.

The pairing of keywords with specific businesses, such as the pairing of "Italian restaurants" with "Il Fornaio", the pairing of "Restaurants" with "Il Fornaio," and the pairing of "sushi" with "Sushitomi," etc., are logged in the search log 154, which is used by the category clustering module 164 in establishing the hierarchical tree 150.

The data collected from, for example, the call logs 152 and search logs 154 may include information on user's response when the user is confused about the category of a specific business. For example, the call logs 152 may show instances where the users reply "I don't know" in response to the question about the type of business of a specific business. The call logs 152 and search logs 154 may include information on how users classify businesses in non-conventional ways, e.g., ways that are different from the classification used by conventional directory services. For example, the call logs 152 and search logs 154 may show instances where users say or type in keywords "hardware store" when they are actually looking for a vendor of cell phones. By capturing a wide range of responses from callers 104 and/or users 156, the system 100 can construct a hierarchical tree 150 that more accurately reflects the classification of businesses according to average users, as opposed to the rigid classification of businesses used in conventional directory services.

The term "user 156" will be used to refer to users who perform keyword searches, whereas the term "user" without the reference number 156 will be used generally to refer to both users 156 and callers 104.

The system 100 may process the search logs 154 to determine whether a link selected by a user 156 is associated with a specific business. When the system 100 determines that the selected link is associated with a specific business, the keyword(s) used in the search can be used as the type of business or category for the specific business.

The category clustering module 164 combines the category-business pairs from the call logs 152 and search logs 154, and builds a generic hierarchical tree 150. For instances where geographical information is also available, the category clustering module 164 sorts the pairs according to geographical location and builds a location-specific hierarchical tree 150 for each geographical location. For example, all the category-business pairs related to businesses in New York city may be used to generate a location-specific hierarchical tree 150, and all the category-business pairs related to businesses in San Jose city may be used to generate a location-specific hierarchical tree 150, etc.

After the generic and location-specific hierarchical trees 150 are updated by the category clustering module 164, a module 166 is used to update the speech recognition language models in the database 106. Each node in the hierarchical tree 150 is associated with a language model in the database 106, so when the category clustering module 164 adds or removes a node from the hierarchical tree 150, or adds or removes types of businesses or specific businesses from the nodes, the corresponding language models in the database 106 are also updated. Each updated language model is biased toward recognizing the specific businesses associated with the respective node.

Because hierarchical trees 150 can have many nodes, the number of language models can be large. A large amount of resources (e.g., disk drive storage space) may be required to maintain the language models. One way to reduce the total number of language models stored in the system (e.g., disk drive) is to build a language model (referred to as a higher-level language model) associated with a parent node from language models (referred to as lower-level language models) associated with child nodes. For example, a first language model for a parent node associated with the "restaurants" type of business can be a combination of a second language model for a child node associated with the "Italian restaurants" type of business and a third language model for a child node associated with the "Japanese restaurants" type of business. The second and third language models can have different weights or influences to the first language model. In one implementation, the system 100 may store weight coefficients for the second and third language models to represent the first language model, saving considerable disk space.

The hierarchical trees 150 can be established and updated in many ways. The following describes an example of how a hierarchical tree 150 can be constructed and updated by the category clustering module 164. This method can be used to construct the generic hierarchical tree and location-specific hierarchical trees.

Referring to FIG. 4A, in the example shown each node of a hierarchical tree 150 includes a table 170 having a list of category-business pairs 172 and their respective counts 174. The counts 174 represent the number of times that the category-business pairs 172 appear in the call logs 152 and search logs 154. For example, the (Restaurants, Il Fornaio) pair has 110 counts, the (Restaurants, Shanghai Garden) pair has 100 counts, the (Sushi, Sushitomi) pair has 10 counts, and the (I don't know, Home Depot) pair has 3 counts. This indicates that past users associated Il Fornaio with the "restaurants" type of business or category 110 times, associated Sushitomi with the "sushi" type of business or category 10 times, etc.

Referring to FIG. 4B, each node includes an index 176 of the types of businesses and their accumulated counts. For example, the "Restaurants" type of business has 200 counts, the "Italian restaurants" type of business has 65 counts, etc.

Referring to FIG. 4C, each node also includes an index 178 of the specific businesses and their accumulated counts. For example, the specific business "Il Fornaio" has 175 counts, and "Ace Hardware" has 23 counts, etc.

The nodes of the hierarchical tree 150 are established by clustering type of category-business pairs based on their counts. In one example, the root of the tree 150 includes all the category-business pairs. The first node below the root is initialized with the category-business pairs associated with the category that has the highest count.

Figure 5A:
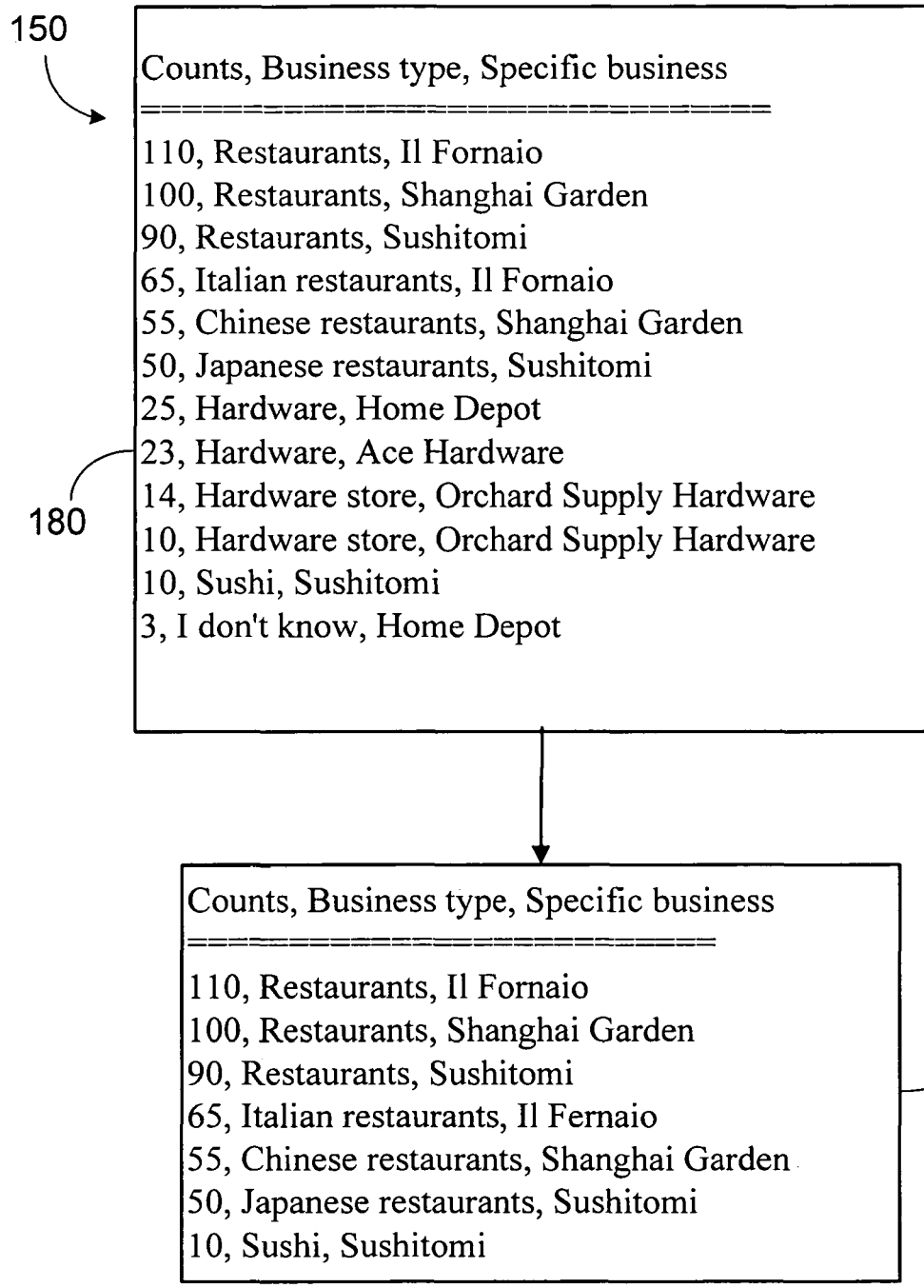
FIGS. 5A to 5C are diagrams showing all or portions of the hierarchical tree during construction of the tree.

Referring to FIG. 5A, the tree 150 initially has only the root node 180 with all the category-business pairs. Because the "restaurants" type of business has the highest count (which is equal to 200, see FIG. 4B), a child node 182 is established and associated with the "restaurants" type of business. All the category-business pairs in which the category is "restaurants" are associated with the new node 182. Thus, the node 182 includes the (restaurants, Il Fornaio), (restaurants, Shanghai Garden), and (restaurants, Sushitomi) pairs. Next, a similarity is computed between each category-business pair and each of the two nodes 180, 182 in the tree 150.

A number of similarity measures can be used to determine whether a category-business pair is more similar (or relevant) to the root node 180 or to the node 182. In some examples, a similarity measure for a particular category-business pair and a particular node is the sum of the term-frequency (TF1) for the category given the categories and the term-frequency (TF2) for the specific business given the specific businesses in that node. The term frequency for a category having a term (e.g., word) is equal to the category counts for that term divided by all category counts in that node. The term-frequency for a specific business having a term (e.g., word) is equal to the specific business counts for that term divided by all specific business counts in that node.

In some examples, the term frequency (TF1+TF2) is weighted by the inverse document frequency, which is the log of the number of nodes divided by the number of nodes containing the term (in the type of business or specific business). If a particular category-business pair has a higher similarity to the new "restaurants" node 182, then the category-business pair is assigned to the new node 182, and the counts are updated for the newly clustered nodes.

Using the similarity measures described above, one can determine that the category-business pairs (Italian restaurants, Il Fornaio), (Chinese restaurants, Shanghai Garden), (Japanese restaurants, Sushitomi), and (sushi, Sushitomi) are associated with the new node 182, while (hardware, Home Depot), (hardware, Ace Hardware), (hardware store, Orchard Supply Hardware), (hardware store, Orchard Supply Hardware), and (I don't know, Home Depot) are associated with the root node 180.

The next new node in the tree 150 can be initialized like the "Restaurants" node 182 by identifying a new category that has the highest count in the node with the most variation. One measure of the variation is the entropy of the category-business pairs in each node, the entropy being defined as the negative sum over all pairs in the node of the probability of each pair times the log of the probability of each pair. For example, the entropy of node 182 is −(110/480*log (110/480)+100/480*log(100/480)+90/480*log(90/480)+65/480*log(65/480)+55/480*log(55/480)+50/480*log(50/480)+10/480*log(10/480)). The entropy for the node 180 can be determined in a similar manner.

The node 180 has a higher variation than the node 182, and the category having the highest count in the node 180 (other than the categories already associated with node 182) is the "hardware" type of business.

Figure 5B:
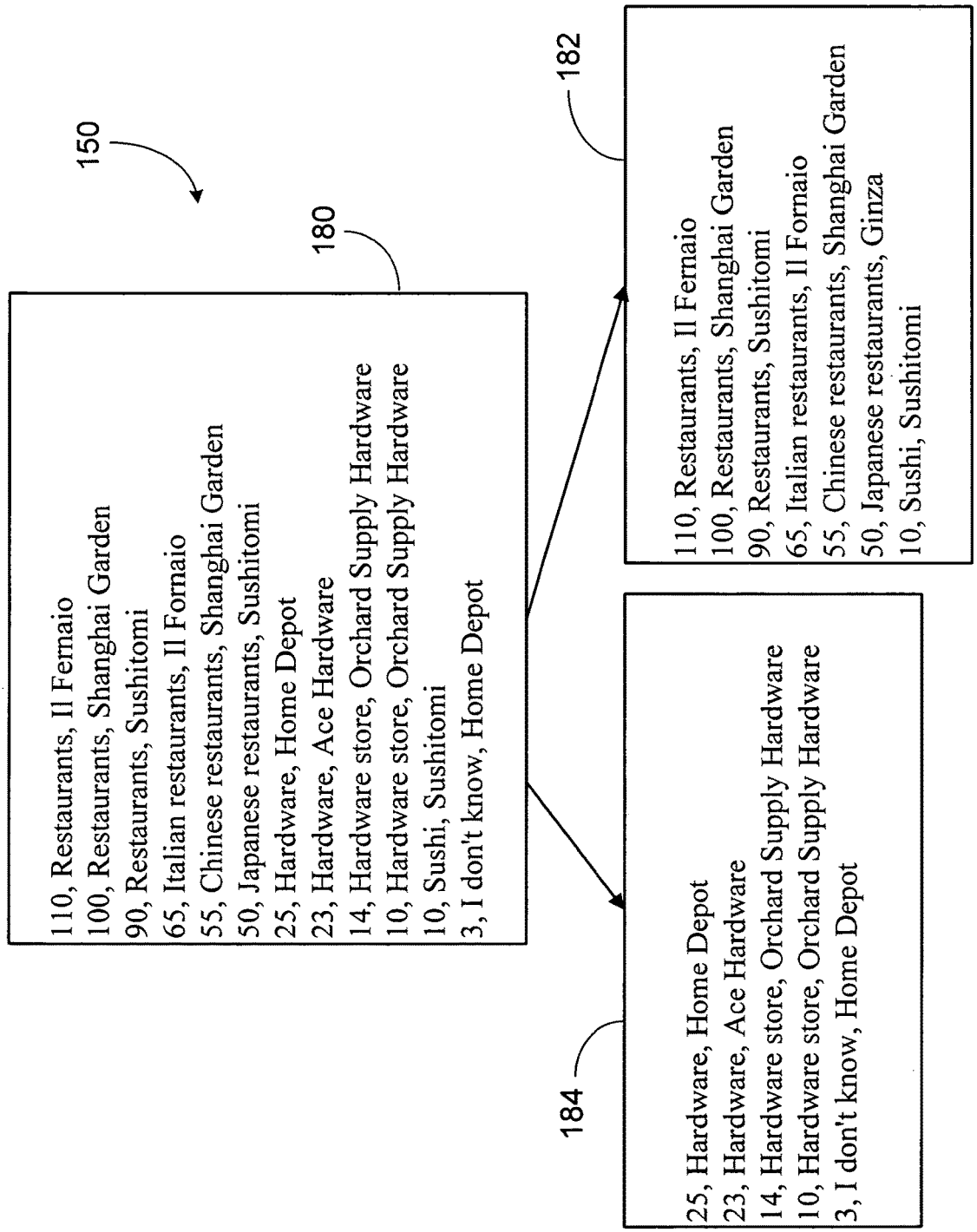

Referring to FIG. 5B, a new node 184 associated with the "hardware" type of business is initialized under the root node 180, and the category-business pairs are reassigned to the nodes 180, 182, 184 using the similarity measures described above.

Figure 5C:
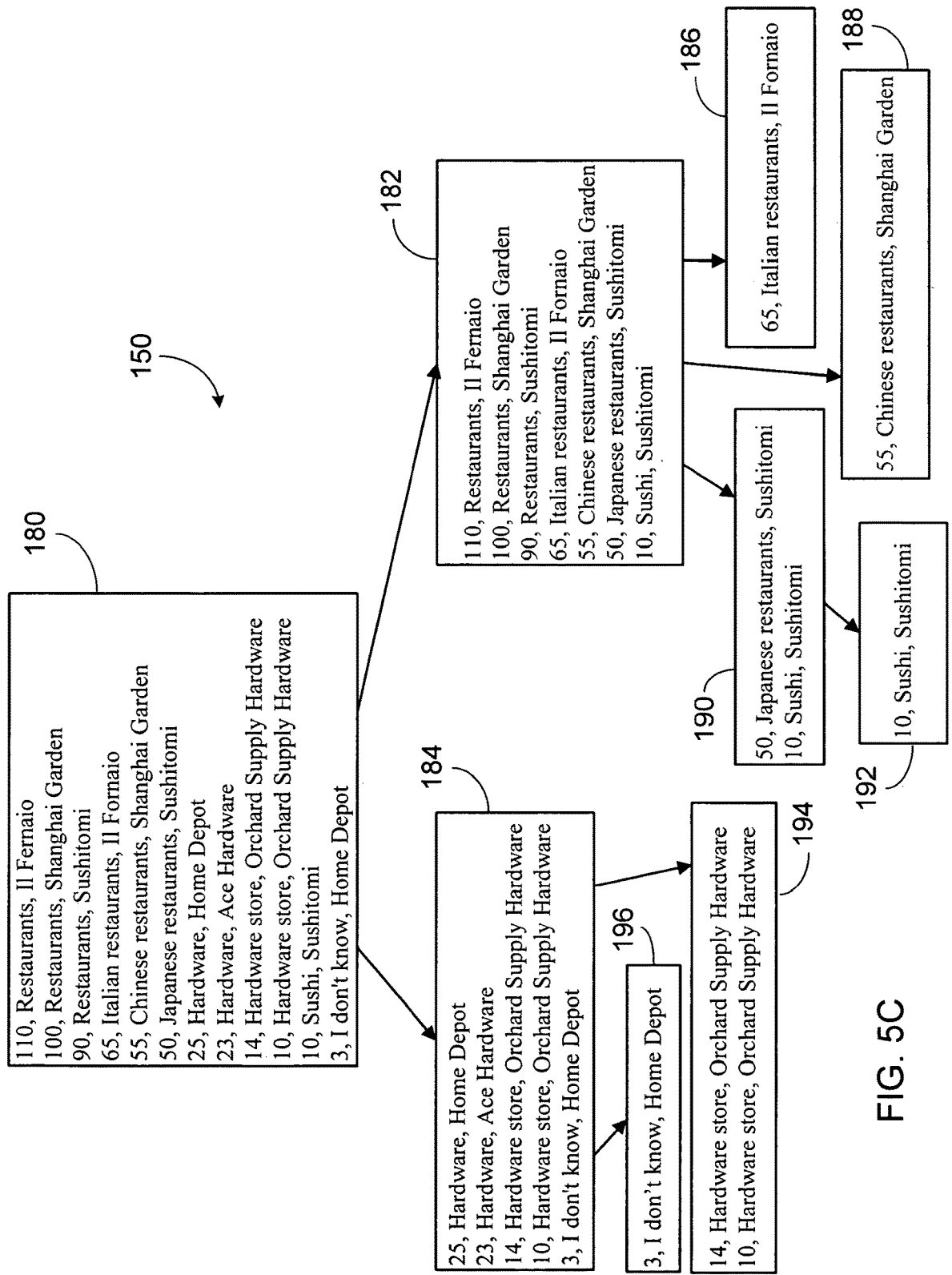

Referring to FIG. 5C, additional nodes can be added to the tree 150 using the method described above. For example, nodes 186, 188, 190, 192, 194, and 196 can be associated with the business type or category "Italian restaurants," "Chinese restaurants," "Japanese restaurants," "sushi," "hardware store," and "I don't know," respectively.

In some examples, the process of adding child nodes continues until an upper limit on the total number of nodes is reached, or until the amount of variation within any terminal node (i.e., a node without any child node) in the tree 150 is less than a pre-defined threshold.

After the hierarchical trees 150 are finalized, the module 166 updates the speech recognition language models in the database 106 so that each node (e.g., 180 to 196) in the tree 150 is associated with a language model in the database 106. The language model associated with a node provides information about probabilities that a speech utterance matches a specific business. The probabilities can be based on the count values. For example, if the caller 104 indicated that the type of business is "restaurant," and the caller's speech utterance matches a waveform for "Il Fornaio" and a waveform for "Sushitomi" to the same degree, the language model associated with node 182 may indicate that the probability that the caller 104 said "Il Fornaio" is higher than the probability that the caller said "Sushitomi."

The hierarchical tree 150 can be updated when additional examples of category-business pairs are available from the call logs 152 and search logs 154. In some examples, the full hierarchical tree 150 can be re-clustered and rebuilt on a regular basis with all the category-business pairs starting in the root node, and clustered as described above. In some examples, the existing hierarchical tree is kept intact and the new category-business pairs are assigned to the nodes with the highest similarity scores as described above. In one implementation, if neither the specific business nor the type of business can be found in the tree 150, the category-business pair is by default assigned to the root node 180.

Figure 6:
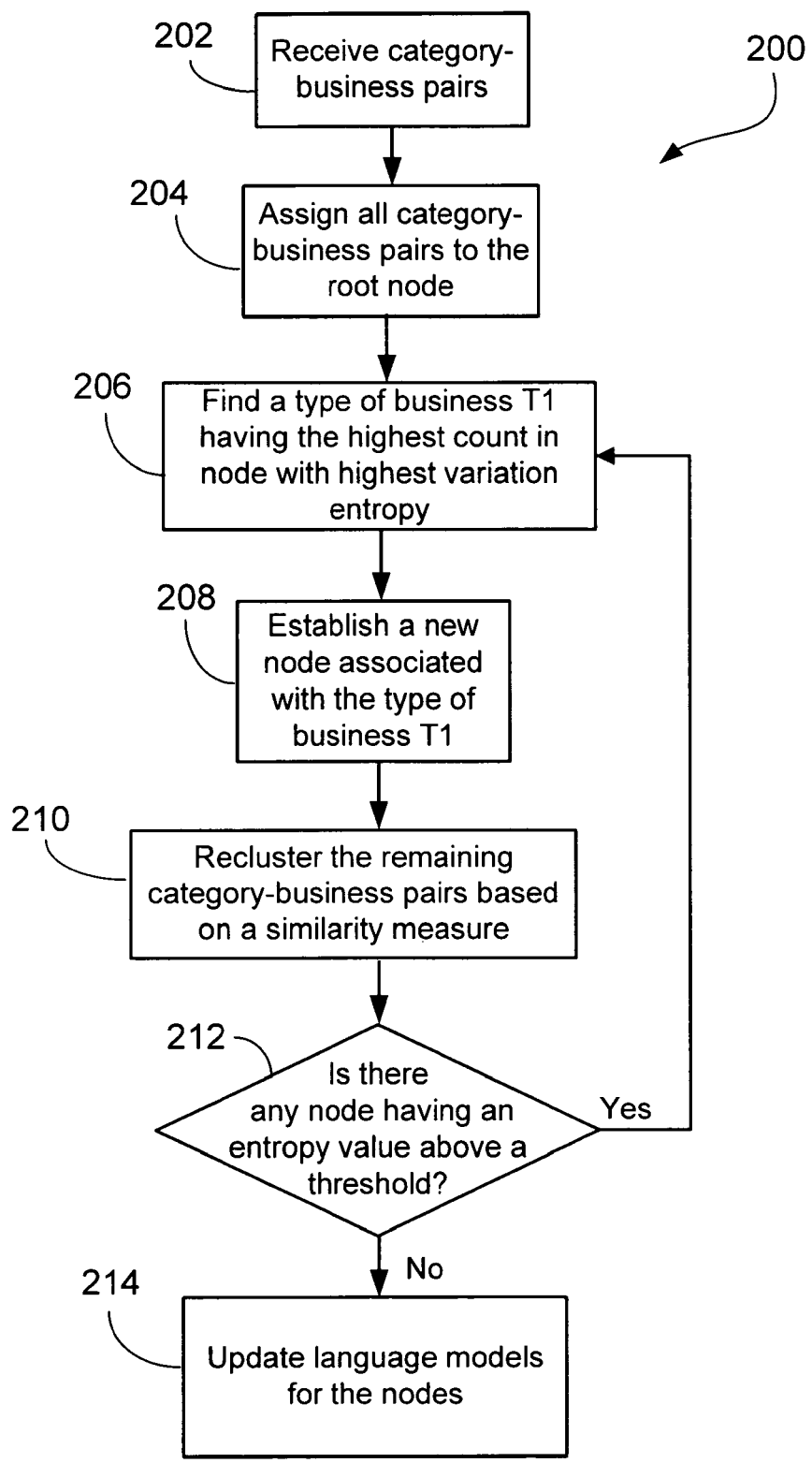
FIG. 6 is a flow diagram of an exemplary process for establishing the hierarchical tree.

FIG. 6 is a flow diagram of an exemplary process 200 for generating a hierarchical tree 150. Pairs of category-business pairs are received 202. All of the category-business pairs are initially assigned 204 to the root node of the tree 150. A type of business T1 having the highest count in a node with the highest variation is found 206. A new node is established 208 for the type of business T1. The category-business pairs associated with the type of business T1 are assigned to the new node. The remaining category-business pairs are re-clustered 210 and assigned to the nodes based on a similarity measure. The entropy values for all the nodes are determined 212. If there is any terminal node having an entropy value above a threshold, the finding 206, establishing 208, and re-clustering 210 are repeated. When all the terminal nodes have entropy values less than the threshold, the hierarchical tree 150 is finalized, and the language models for the nodes are updated 214.

For example, in the process 200, the category-business pairs can be received from the call logs 152 and search logs 154 (FIG. 3). The assigning 204, finding 206, establishing 208, re-clustering 210, and determining 212 entropy values can be performed by the category clustering module 164. The updating 214 can be performed by the module 166 for updating speech recognition language models.

Figure 7:
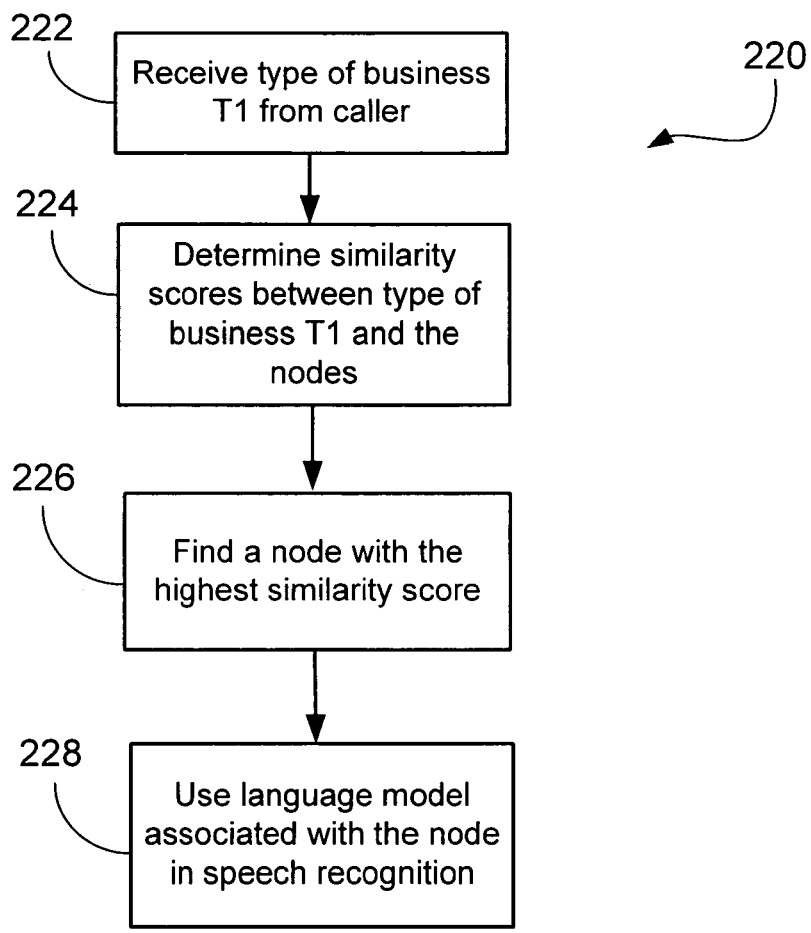
FIG. 7 is a flow diagram of an exemplary process for mapping the hierarchical tree.

FIG. 7 is a flow diagram of an exemplary process 220 for mapping a type of business to the nodes of the hierarchical tree 150 to determine which language models to use for recognizing a specific business. A type of business T1 is received 222. Similarity scores between the type of business T1 and the nodes are determined 224. Each similarity score indicates a similarity between the type of business T1 and the types of businesses associated with a node. A node with the highest similarity score is found 226. The language model associated with the node is used 228 to recognize a specific business in a speech input.

For example, in the process 220, type of business T1 can be determined by the speech recognition engine 104 that recognizes the type of business in the speech input from the caller 104. The determining 224 and the finding 226 can be performed by the mapping module 108 (FIG. 1). The speech recognition engine 104 can use 228 the language model found by the mapping module 108 to recognize the specific business in the speech input from the caller 104.

Rather than computing the similarity scores each time the system 100 needs to determine which node corresponds to a type of business provided by the caller 104, the system can pre-compute the similarity scores for often-used types of businesses. For example, based on historical data, the system may determine that "Japanese restaurants" is a type of business that often receives requests. Using the hierarchical tree 150 in FIG. 5C as an example, the system 100 may pre-compute the similarity scores between "Japanese restaurants" and the nodes 108 to 196, and determines that nodes 190, 182, and 180 are relevant in recognizing Japanese restaurants. The system 100 then pre-computes the weights c1, c2, and c3 to be assigned to the language models associated with the nodes 190, 182, and 180, respectively. In some examples, the weights can be the similarity scores. The weights c1, c2, and c3 can be stored in a table.

When a caller 104 calls for information about a specific business and provides "Japanese restaurants" as the type of business, the mapping module 108 looks up the table and determines that the relevant nodes are 190, 182, and 180, and the weights for corresponding language models are c1, c2, and c3, respectively. The language models associated with nodes 190, 182, and 180, along with their respective weights c1, c2, and c3, are provided to the speech recognition engine 104 to recognize the name of the specific business.

The system 100 can pre-compute the similarity scores and weights for language models taking into account the different geographical locations. For example, the system 100 may determine that when a caller 104 is asking for information about an Italian restaurant in San Jose, there are relevant nodes in a first hierarchical tree for San Jose, a second hierarchical tree for Palo Alto, a third hierarchical tree for Sunnyvale, and a fourth hierarchical tree for Mountain View, respectively. The system 100 can pre-compute the weights to be applied to the language models associated with these nodes, and store the weights in a table. When a caller 104 calls to ask about an Italian restaurant in San Jose, the mapping module 108 looks up the table, determines which nodes are relevant in the first, second, third, and fourth hierarchical trees, determines their respective weights, and sends this information to the speech recognition engine 104 to recognize the name of the Italian restaurant in San Jose.

3. Multi-Server System

The following describes an example of a voice-enabled business listing search system that is implemented using multiple machines.

The system 100 of FIG. 1 can be implemented using several servers linked together via a network. A server can be, e.g., a work station, a personal computer, or an arbitrary processing unit. Each of the modules in FIG. 1 can be performed by a separate server. For example, one server may perform the functions of the user interface 102, and another server may perform the functions of the mapping module 108. There may be multiple servers performing the functions of the search engine 110.

The database 106 in FIG. 1 may be stored in disk drives of different servers at different locations. There may be multiple speech recognition engines 104 running on different servers situated at different locations, each speech recognition engine 104 accessing one or more databases 106 of language models and being responsible for recognizing specific businesses associated with particular types of businesses and/or geographical locations.

The hierarchical tree 150 can be used as a roadmap for determining which servers are responsible for the recognition tasks. Each server can be assigned to be responsible for processing recognition tasks related to particular nodes of the hierarchical trees 150. When a caller 104 calls the system 100 and asks for information about a specific business by saying a geographical location, a type of business, and a name of the specific business, the mapping module 108 maps the geographical location and type of business to the hierarchical trees 150 using, e.g., the similarity measures described above, to find the node having the best match. The servers responsible for the node having the best match and its ancestor nodes are called to recognize the name of the specific business.

Some servers may be responsible for the nodes of the generic hierarchical tree, and some servers may be responsible for the nodes of location-specific hierarchical trees. The recognition results from the various servers can be sent to a central server that determines a final recognition result.

4. Additional Examples

Although some examples have been discussed above, other implementations and applications are also within the scope of the following claims. For example, the user interface 102 (FIG. 1) can be operated by a different company (e.g., TellMe Networks, Inc.) that specializes in voice-enabled user interfaces. The system 100 can be used to recognize people's names or names of entities other than businesses, such as non-profit organizations.

For example, the system 100 may provide a personal directory service. The user interface 102 may prompt the caller 104 for information about the geographical location, category, and name of a person. The geographical location can be, e.g., city and state. The category can be, e.g., "Stanford alumni" or "Google employee." The speech recognition engine 104 may recognize the name of the person based on the geographical location and the category information. The system 100 may then provide relevant data (e.g., the phone number of the person) to the caller 104, and provide the option of connecting the caller to the person.

For example, the system 100 may provide a merchandise locator service. The user interface 102 may prompt the caller 104 for information about a geographical location, a category, and a name of a merchandise item. The geographical location can be, e.g., city and state. The category can be, e.g., "flat panel television" or "cars." The name can be, e.g., "Sharp AQUOS® 45 inch HDTV" or "Toyota Prius." The speech recognition engine 104 may recognize the name of the merchandise based on the geographical location and the category information, and return a list of stores within or near the geographical location that sells the merchandise. By asking for information related to the geographical location and category of the merchandise, a speech recognition engine can more accurately recognize the name of the merchandise and provide better service to the user.

A voice-enabled navigation system can provide directions to a specific business. The navigation system may receive from a user a type of business and a name of the specific business. The navigation system may have information about the location of the navigation system using, e.g., GPS signals, and recognize the name of the specific business based on the location and the type of business. For example, a driver of a car may say "Show me the directions to Il Fornaio, an Italian restaurant, near Palo Alto." The navigation system may be able to more accurately recognize "Il Fornaio" based on the knowledge that Il Fornaio is an Italian restaurant and is located near Palo Alto, as compared to a navigation system that attempts to recognize the names of businesses using only information about the geographical locations of the businesses.

The search logs 154 can include data from, e.g., desktop searches or searches on intranets. The system 100 may reside at a personal computer, and the call logs 152 may include historical data on past usage of the system 100 by one or more users of the personal computer to obtain information about specific businesses using, for example, voice commands.

The data structure for clustering nodes does not necessarily have to be a hierarchical tree structure as shown in FIG. 5C. Other types of data structures can also be used.

Each module in FIGS. 1 and 3, and each process in FIGS. 2, 6, and 7 can be implemented by software, hardware, or a combination of both. The following describes an example of a general computing system that can be used to implement the search systems described above.

Figure 8:
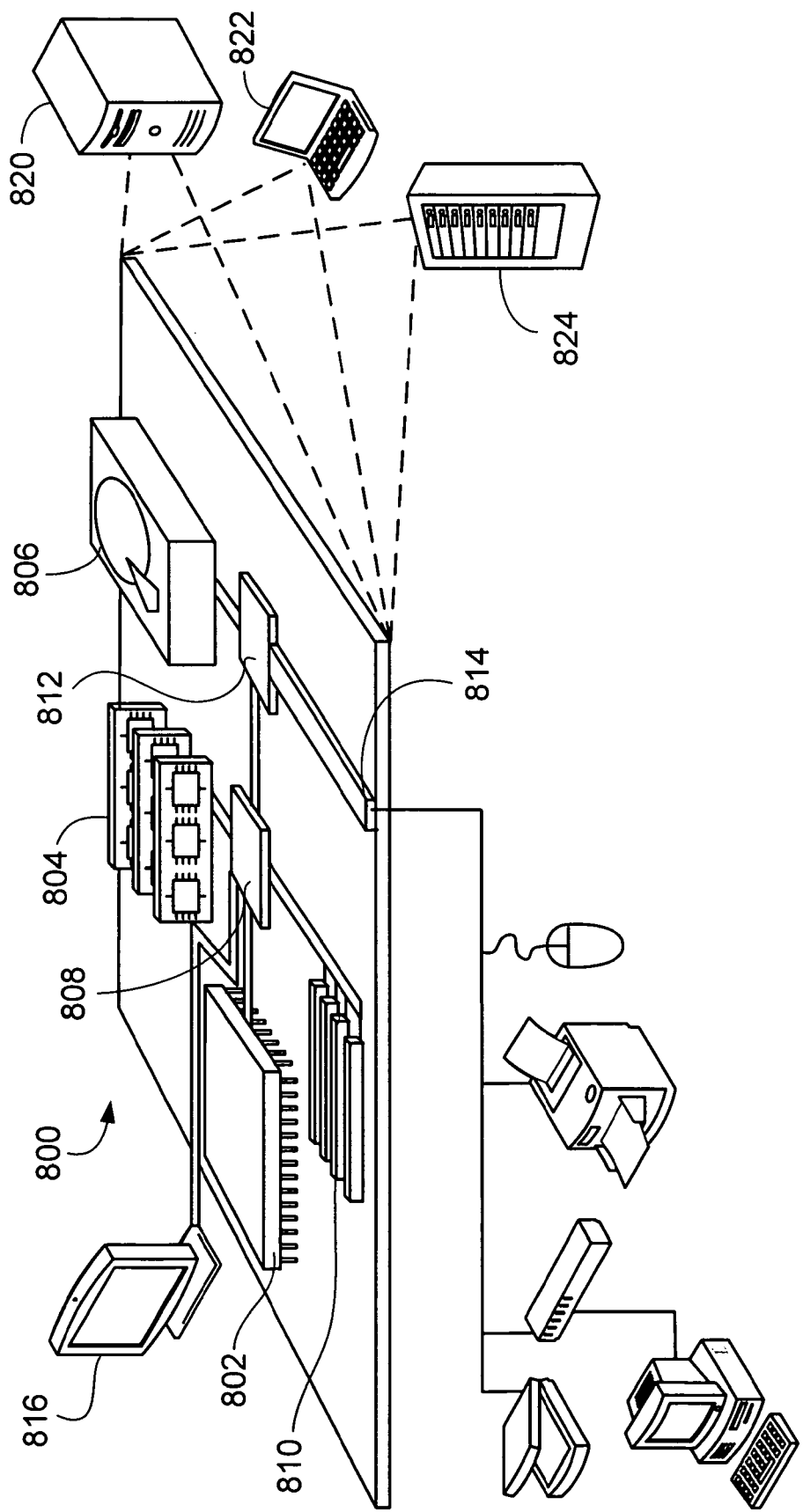
FIG. 8 is a schematic diagram of an exemplary computing system.

FIG. 8 shows a schematic representation of a general computing system. Computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Each of such devices (e.g., standard server, rack server system, personal computer, laptop computer) may contain one or more of computing device 800, and an entire system may be made up of multiple computing devices 800 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, trackball, touch-sensitive screen, or iDrive-like component) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications and methods have been described, it should be recognized that numerous other applications are contemplated. Accordingly, other embodiments are within the scope of the following claims.

What is claimed is:

1. A method of providing navigation directions, the method comprising:
receiving, at a user terminal, a query spoken by a user, wherein the query spoken by the user includes a speech utterance indicating (i) a category of business, (ii) a name of the business, (iii) a name of a geographic location, and (iv) an indication that the business is located near the geographic location;
identifying, by processing hardware, the business based on the speech utterance;
and providing navigation directions to the business via the user terminal.

2. The method of claim 1, further comprising:
prompting the user to provide a geographical location.

3. The method of claim 1, further comprising, after recognizing the identifier of the specific business, providing information about the specific business to the user.

4. The method of claim 3, wherein providing information about the specific business comprises providing a phone number of the specific business.

5. The method of claim 1 wherein recognizing the identifier of the specific business comprises biasing a speech recognition module towards one or more language models associated with the type of business.

6. The method of claim 1, further comprising:
selecting, from a set of speech recognition language models for recognizing speech, a subset of speech recognition language models, wherein the subset of speech recognition language models is selected based on the location.

7. The method of claim 6, wherein the set of speech recognition language models includes N-grams in which a probability of a word in a vocabulary is estimated by counting the occurrences of that word in the context of a last N words.

8. The method of claim 6, wherein the set of speech recognition language models includes phrase-list grammars in which a probability of a phrase is estimated by counting the occurrences of the phrase.

9. A system, comprising:
one or more processors; and
memory storing instructions that when executed by at least some of the one or more processors effectuates operations comprising:
receiving, from a user terminal, a query spoken by a user, wherein the query spoken by the user includes a speech utterance indicating (i) a category of business, (ii) a name of the business, (iii) a name of a geographic location, and (iv) an indication that the business is located near the geographic location;
identifying, by the one or more processors, the business based on the speech utterance; and
providing navigation directions to the business to the user terminal.

10. The system of claim 9, wherein the speech utterance includes a name of the geographic location and an indication that the business is located near the geographic location.

11. The system of claim 9, wherein the speech utterance includes a name of the geographic location and an indication that the business is located near the geographic location.

12. The system of claim 9, wherein the operations further comprise:
prompting the user to provide a geographical location.

13. The system of claim 9, wherein the operations further comprise:
after recognizing the identifier of the specific business, providing information about the specific business to the user.

14. The system of claim 13, wherein the operations further comprise:
providing information about the specific business comprises providing a phone number of the specific business.

15. The system of claim 13, wherein recognizing the identifier of the specific business comprises biasing a speech recognition module towards one or more language models associated with the type of business.

16. The system of claim 9, wherein the operations further comprise:
   selecting, from a set of speech recognition language models for recognizing speech, a subset of speech recognition language models, wherein the subset of speech recognition language models is selected based on the location.

17. The system of claim 16, wherein the set of speech recognition language models includes N-grams in which a probability of a word in a vocabulary is estimated by counting the occurrences of that word in the context of a last N words.

18. The system of claim 16, wherein the set of speech recognition language models includes phrase-list grammars in which a probability of a phrase is estimated by counting the occurrences of the phrase.

\* \* \* \* \*